(12) United States Patent
Pines et al.

(10) Patent No.: US 7,116,637 B2
(45) Date of Patent: Oct. 3, 2006

(54) SYSTEM AND METHOD FOR DIAGNOSING A POTS PORT

(75) Inventors: Philip J. Pines, Palo Alto, CA (US); Blake A. Henry, Santa Barbara, CA (US)

(73) Assignee: Verso Technologies, Inc., Atlanta, GA (US)

( * ) Notice: Subject to any disclaimer, the term of this patent is extended or adjusted under 35 U.S.C. 154(b) by 1039 days.

(21) Appl. No.: 09/948,387

(22) Filed: Sep. 6, 2001

(65) Prior Publication Data

US 2002/0064150 A1    May 30, 2002

Related U.S. Application Data

(60) Provisional application No. 60/230,492, filed on Sep. 6, 2000.

(51) Int. Cl.
*H04L 12/28* (2006.01)
*H04L 12/66* (2006.01)
*G01R 31/08* (2006.01)

(52) U.S. Cl. ............ 370/241; 370/352; 370/389; 370/395.1

(58) Field of Classification Search ........ 370/241, 370/250, 251, 242, 240, 216, 244, 247, 248; 379/22, 1.01, 22.04, 3, 9.02, 9.04, 14.01, 379/26.01, 26.02, 27.01, 2, 9.06, 12, 22.08
See application file for complete search history.

(56) References Cited

U.S. PATENT DOCUMENTS

| | | | |
|---|---|---|---|
| 3,955,052 A | 5/1976 | Orbach | |
| 4,087,647 A | 5/1978 | Embree et al. | |
| 4,110,636 A | 8/1978 | Dijkmans | |
| 4,203,009 A | 5/1980 | Tattersall | |
| 4,292,478 A | 9/1981 | Davis et al. | |
| 4,315,106 A | 2/1982 | Chea, Jr. | |
| 4,315,207 A | 2/1982 | Apfel | |
| 4,388,500 A | 6/1983 | Regan | |
| 4,419,542 A | 12/1983 | Embree et al. | |
| 4,431,868 A | 2/1984 | Bolus et al. | |
| 4,433,213 A | 2/1984 | Albers et al. | |
| 4,445,006 A | 4/1984 | Scholich | |
| 4,472,608 A | 9/1984 | Beirne | |
| 4,476,350 A | 10/1984 | Aull et al. | |
| 4,484,032 A | 11/1984 | Rosenbaum | |
| 4,514,595 A | 4/1985 | Rosenbaum et al. | |
| 4,543,524 A | 9/1985 | Bulley | |
| 4,612,417 A | 9/1986 | Toumani | |
| 4,679,224 A | 7/1987 | Lynch et al. | |
| 4,791,659 A | 12/1988 | Ross | |

(Continued)

FOREIGN PATENT DOCUMENTS

EP    0394051 B1    7/1996

(Continued)

OTHER PUBLICATIONS linktionary.com (IAD) <http://www.linktionary.com/a/asic.html> (last accessed Dec. 12, 2005).

(Continued)

*Primary Examiner*—Hanh Nguyen
(74) *Attorney, Agent, or Firm*—Carr & Ferrell LLP (57) ABSTRACT

A method for diagnosing Voice-over-Broadband circuitry including an Integrated Access Device. The method includes receiving a request to initiate diagnosis, pulsing source voltages of tip and ring amplifiers in the circuitry, aggregating signal line noise resulting from the pulsing, analyzing the aggregated noise for hallmark indicia, and reporting findings of the analysis.

6 Claims, 12 Drawing Sheets

IAD POTS Port

U.S. PATENT DOCUMENTS

| | | | |
|---|---|---|---|
| 4,860,332 A * | 8/1989 | Chism | 379/1.01 |
| 4,937,851 A | 6/1990 | Lynch et al. | |
| 5,157,708 A | 10/1992 | Garthwaite et al. | |
| 5,166,925 A | 11/1992 | Ward | |
| 5,278,828 A | 1/1994 | Chao | |
| 5,452,010 A | 9/1995 | Doornink | |
| 5,467,432 A | 11/1995 | Ota | |
| 5,473,385 A | 12/1995 | Leske | |
| 5,528,661 A * | 6/1996 | Siu et al. | 379/29.01 |
| 5,533,021 A | 7/1996 | Branstad et al. | |
| 5,559,854 A | 9/1996 | Suzuki | |
| 5,565,924 A | 10/1996 | Haskell et al. | |
| 5,598,455 A | 1/1997 | Bliven et al. | |
| 5,636,202 A | 6/1997 | Garney | |
| 5,761,273 A * | 6/1998 | Sanders | 379/22 |
| 5,784,558 A | 7/1998 | Emerson et al. | |
| 5,790,523 A | 8/1998 | Ritchie, Jr. et al. | |
| 5,790,543 A | 8/1998 | Cloutier | |
| 5,793,751 A | 8/1998 | Baker et al. | |
| 5,825,849 A * | 10/1998 | Garland et al. | 379/22.01 |
| 5,854,839 A * | 12/1998 | Chen et al. | 379/413 |
| 5,881,129 A * | 3/1999 | Chen et al. | 379/26.02 |
| 5,883,883 A | 3/1999 | Baker et al. | |
| 5,892,756 A | 4/1999 | Murphy | |
| 5,909,445 A | 6/1999 | Schneider | |
| 5,912,880 A | 6/1999 | Bernstein | |
| 5,991,270 A | 11/1999 | Zwan et al. | |
| 6,002,671 A | 12/1999 | Kahkoska et al. | |
| 6,014,425 A | 1/2000 | Bingel et al. | |
| 6,058,162 A | 5/2000 | Nelson et al. | |
| 6,091,713 A | 7/2000 | Lechleider et al. | |
| 6,292,468 B1 * | 9/2001 | Sanderson | 370/241 |
| 6,301,227 B1 * | 10/2001 | Antoniu et al. | 370/241 |
| 6,574,313 B1 * | 6/2003 | Chea et al. | 379/93.09 |
| 6,584,122 B1 * | 6/2003 | Matthews et al. | 370/493 |
| 2002/0078225 A1 | 6/2002 | Pines | |

FOREIGN PATENT DOCUMENTS

| | | |
|---|---|---|
| EP | 1 005 209 A2 | 5/2000 |
| WO | WO 98/47251 A2 | 10/1998 |

OTHER PUBLICATIONS linktionary.com (ASIC) <http://www.linktionary.com/i/iad.html> (last accessed Dec. 12, 2005).

* cited by examiner

SYSTEM AND METHOD FOR DIAGNOSING A POTS PORT

CROSS REFERENCE TO RELATED APPLICATIONS

The invention claims priority from U.S. Provisional Application Ser. No. 60/230,492, filed Sep. 6, 2000, and entitled "System and Method for Diagnosing a POTS Port and Circuitry", the disclosure of which in herein incorporated by reference.

BACKGROUND OF THE INVENTION

1. Field of the Invention

This invention relates generally to Voice-over-Broadband (VoB) communication systems, and particularly to diagnostic assessments of the integrity of VoB systems.

2. Discussion of the Prior Art

Figure 1:
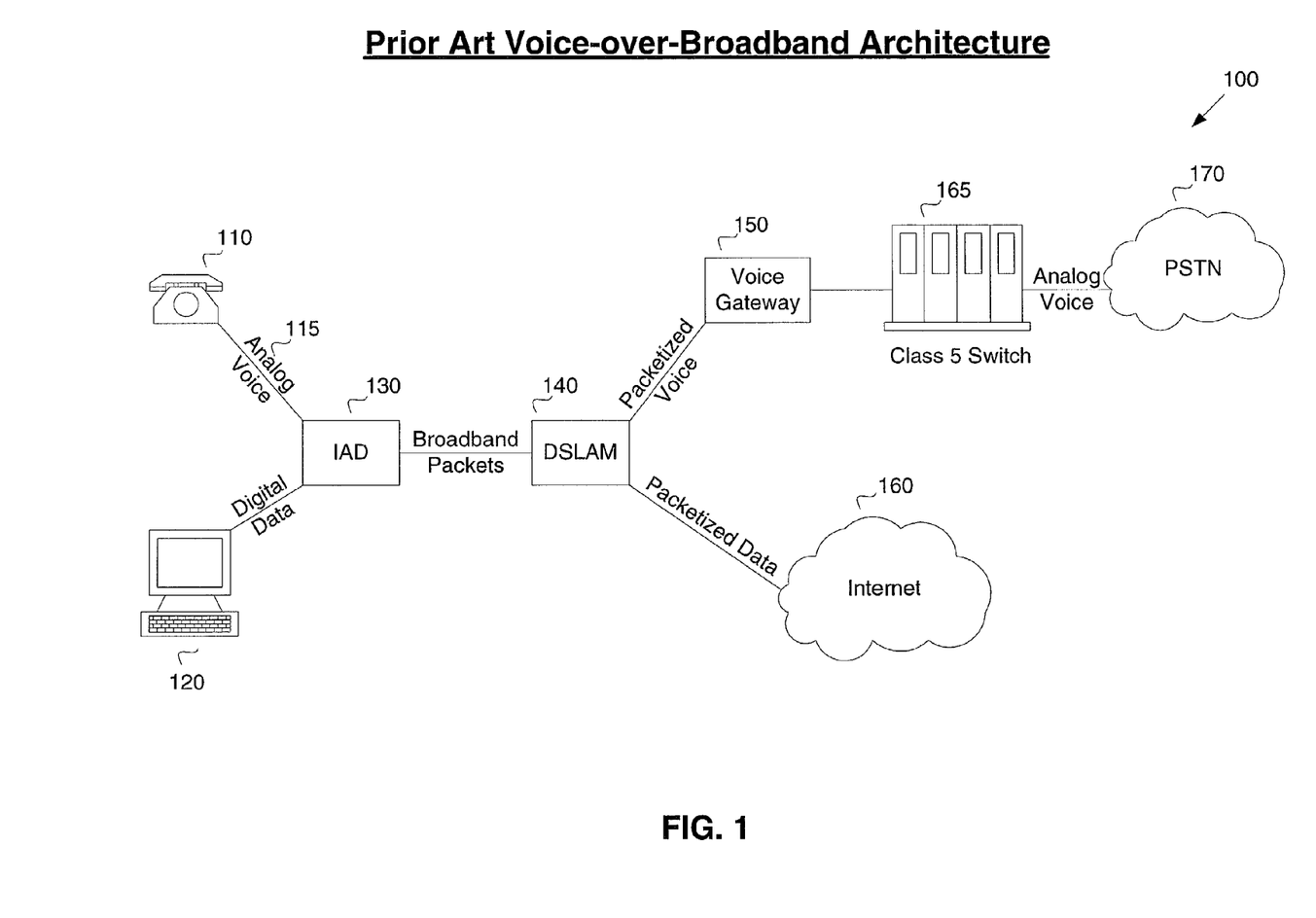
FIG. 1 is a high-level view of a prior art voice-over-broadband architecture.

VoB systems are known in the prior art. VoB system service users are typically referred to as subscribers. FIG. 1 shows a prior art VoB system 100, which commences at one end with traditional Plain Old Telephone Service (POTS) devices 110 that receive and transmit analog voice signals over subscriber lines 115. An Integrated Access Device (IAD) 130 digitizes/packetizes these analog voice signals into a broadband format and integrates the resultant voice packets with additional digital data provided by other customer premise equipment such as personal computer 120. IAD 130 prioritizes voice packets over data packets to preserve transmitted voice signal quality. The voice and data packets are carried over the local broadband access network to an access multiplexer known as a Digital Subscriber Line Access Multiplexer (DSLAM) 140. DSLAM 140 aggregates the packets, transports voice packets to a voice gateway 150 and transports data packets to the Internet 160. Voice gateway 150 depacketizes voice packets and converts them to standard analog POTS signals for delivery via a Class 5 switch 165 to the Public Switched Telephone Network (PSTN) 170.

Figure 2:
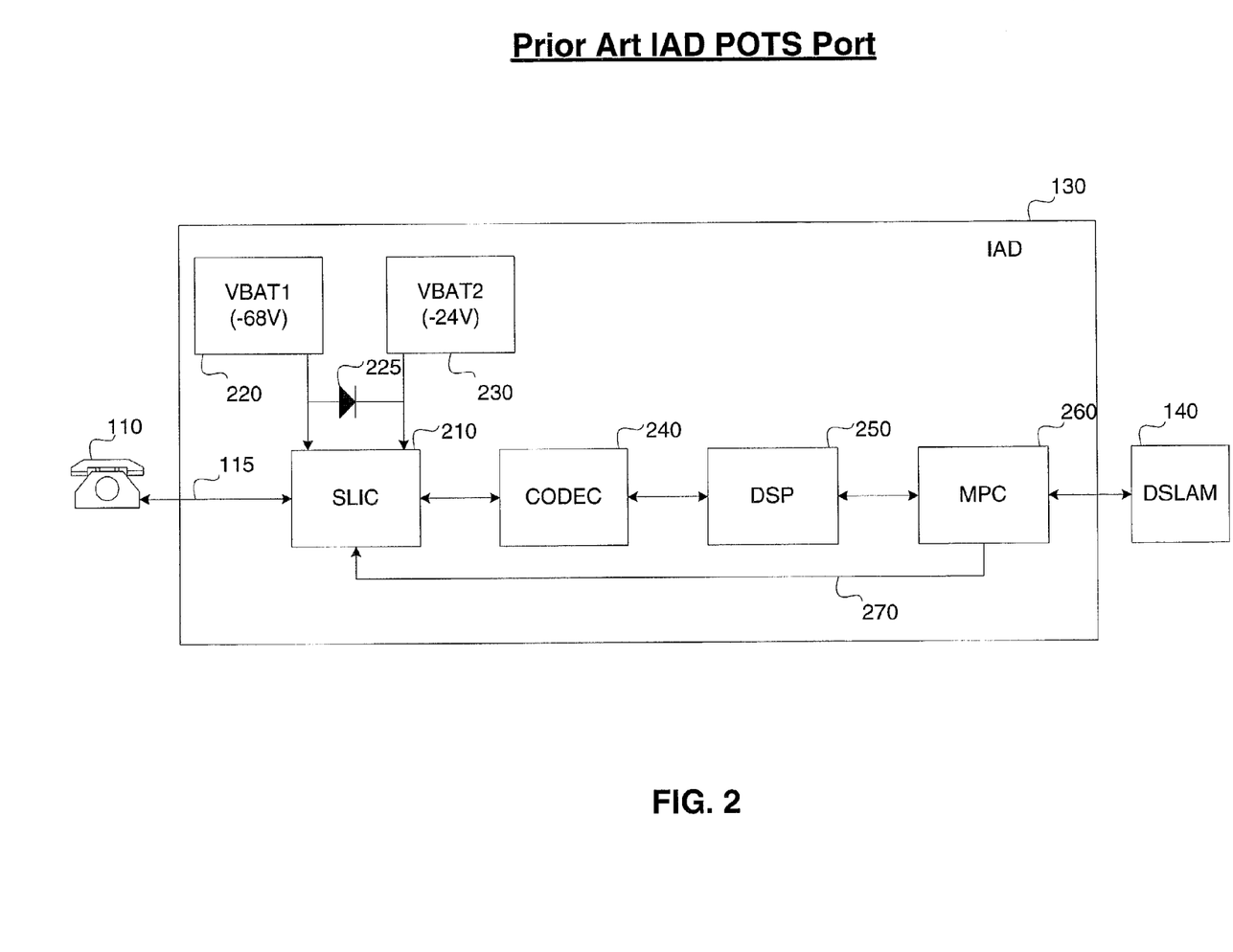
FIG. 2 shows additional detail of a prior art IAD.

FIG. 2 shows details of IAD 130. A POTS device 110 connected to the subscriber's line 115 is in turn connected with a Subscriber Line Interface Circuit (SLIC) 210. The SLIC 210 has inputs for a primary battery supply (VBAT1) 220 and an auxiliary battery supply (VBAT2) 230, and has a battery switching circuit 373 (FIG. 5) for connecting to VBAT1 220 to present a high on-hook voltage, and then connecting to VBAT2 230 to present a low off-hook voltage in short-loop applications. VBAT1 and VBAT2 are connected in series by a diode 225. The diode serves as a protection device to prevent the VBAT1 (−68V) supply from going more positive than the VBAT2 (−24V) supply. This would happen if the VBAT1 supply failed, since VBAT1 voltage (−68V) is obtained by adding a −44 voltage to the VBAT2 supply. SLIC 210 passes analog POTS signals to a coder/decoder (CODEC) 240 and receives analog signals from CODEC 240. CODEC 240 converts analog voice signals into broadband digital format, and vice versa. IAD 130 can include a digital signal processor (DSP) 250 for removing noise from the digital signals. Finally, IAD 130 employs a microprocessor controller (MPC) 260 as a central software-driven controller. MPC 260 can manipulate digital signals as necessary per the instructions of an installed software application, can receive state information from the various IAD 130 components, and can send digital control signals to the other components of IAD 130. In particular, MPC 260 sends digital control inputs 270 to SLIC 210, which control internal SLIC states. FIG. 2, for clarity, shows only one POTS port and only the processing of voice data. In practice, an IAD 130 also processes incoming digital data and includes multiple ports (typically in RJ-11 format) for connecting multiple POTS devices 110.

Thus the IAD 130 is a critical component of a VoB system. As VoB systems gain market share in the communications industry, IAD equipment will proliferate and it will become more important that VoB service providers have the ability to efficiently and cost effectively maintain IADs. Additionally, as users of traditional POTS devices shift to VoB service, it will become imperative, for the sake of customer relations, that VoB service providers give useful customer support regarding the low technology POTS devices. POTS devices rely on a simple two-wire loop for all their power and signaling needs and do not provide any diagnostic signaling. Thus, there is a need in the art of VoB communications for diagnostic tests on IAD equipment and POTS devices that do not require additional hardware modifications and associated costs (i.e., abide by the constraints of existing hardware designs) and do not require physical site visits for the purpose of conducting the diagnostic tests.

SUMMARY

The invention encompasses a method for diagnosing Voice-over-Broadband circuitry including an Integrated Access Device. The method includes receiving a request to initiate diagnosis, pulsing source voltages of tip and ring amplifiers in the circuitry, aggregating signal line noise resulting from the pulsing, analyzing the aggregated noise for hallmark indicia, and reporting findings of the analysis.

A system in accordance with the invention remotely diagnoses Voice-over-Broadband circuitry by pulsing the source voltages of the tip and ring amplifiers in the circuitry and analyzing the resultant noise for hallmark indicia. The system comprises a broadband line and an Integrated Access Device connected to the broadband line. The Integrated Access Device includes a controller connected to the broadband line, a coder/decoder connected to the controller, a Subscriber Line Interface Circuit connected to the coder/decoder, primary and auxiliary power sources connected to the Subscriber Line Interface Circuit, a Plain Old Telephone System port connected to the Subscriber Line Interface Circuit, and a signal line which interconnects the broadband line, controller, coder/decoder, Subscriber Line Interface Circuit, and Plain Old Telephone System port. The Subscriber Line Interface Circuit has tip and ring amplifiers and a switching circuit for pulsing the source voltage of the tip and ring amplifiers. The controller executes software to control the switching circuit into pulsing the source voltages of the tip and ring amplifiers in accordance with the invention.

DETAILED DESCRIPTION OF THE INVENTION

Figure 3:
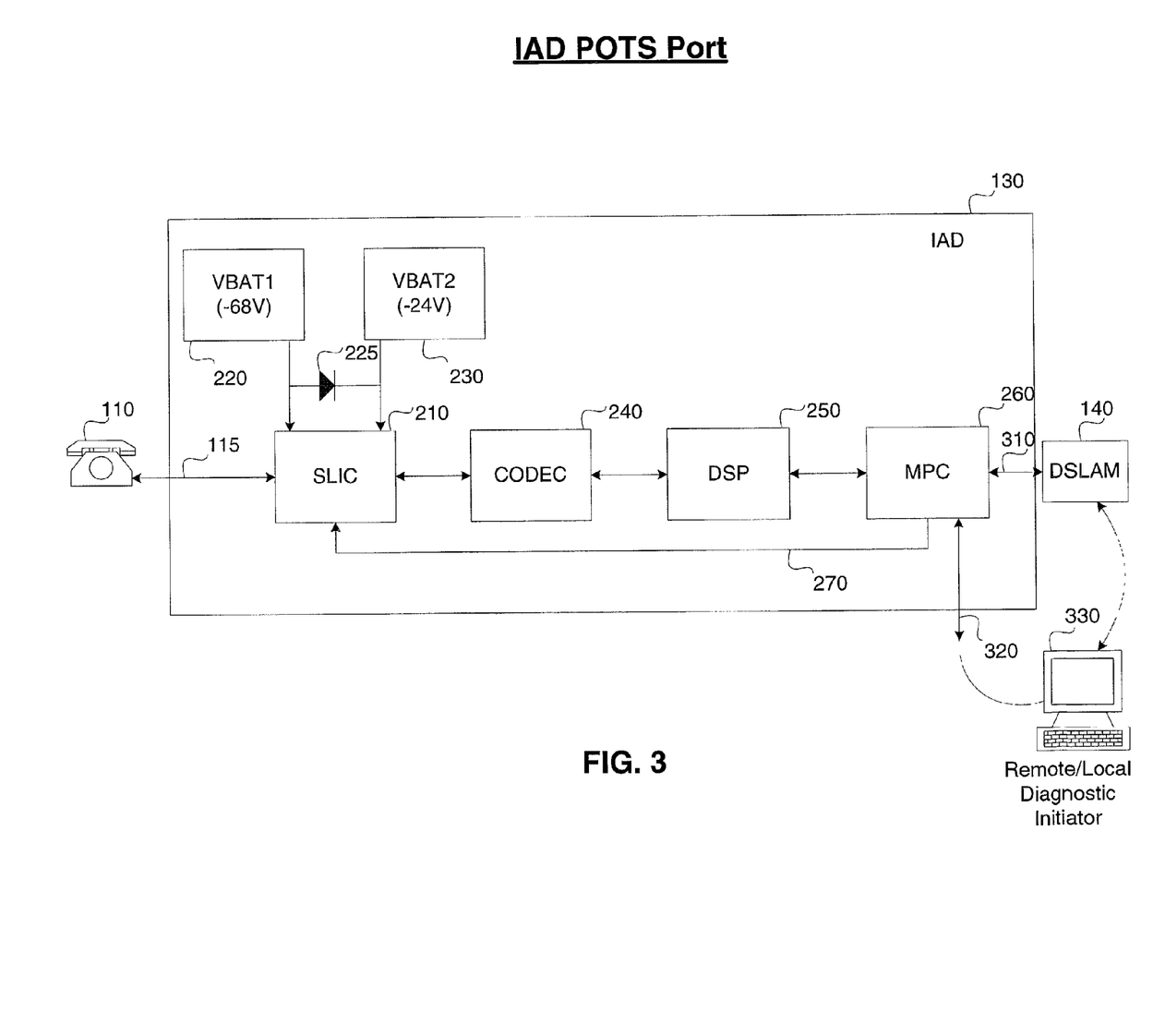
FIG. 3 shows hardware aspects of the present invention.

The invention provides a system and method for remotely conducting various diagnostic tests of an IAD's circuitry and connection integrity with a POTS device 110. FIG. 3 shows an IAD 130 configuration including a SLIC 210, a VBAT1 power supply 220, a diode 225, a VBAT2 power supply 230, a CODEC 240, an optional DSP 250, an MPC 260, and digital control inputs 270. MPC 260 is connected to a broadband line 310, a DSLAM 140, an RS-232 port 320, and an external computer 330. From a hardware perspective, the invention is similar to, and requires no additional hardware or design modifications over, the FIG. 2 prior art. Thus, the invention addresses the prior art need for efficient maintenance and support of IADs and associated POTS devices.

External computer 330 is optional and is most likely to be used only to initiate the diagnostic tests. Execution of the diagnostic tests of the invention does not require external computer processing. The detailed diagnostic test instructions and the collection and analysis of test data can all be done by a computer software application installed within IAD 130, preferably within MPC 260. Thus, the invention can be practiced as a software-only upgrade to the prior art IAD hardware 130.

The external computer, if used, can be either: (a) located remotely and connected via the broadband line 310 to the IAD 130; or (b) located locally and connected via the RS-232 port 320.

The technique of the invention pulses the internal IAD DC power supplies (VBAT1 220 and VBAT2 230), collects resultant noise signals within the IAD 130 and analyzes the data to determine the status of IAD circuitry and the integrity of connections with POTS devices. It should be noted that in one commercial embodiment the noise signals are measured using an AC coupled measuring system originally intended to digitize voice signals on the telephone line and block the VBAT2 battery voltage, which is present in addition to the voice signal. In other words, the measurements in that embodiment are of the AC transients (or the first derivative) of the DC pulsing. However, other embodiments can rely on DC coupled measurements and the methods and systems detailed here remain completely applicable. The only impact caused by using DC coupled noise measurements, as opposed to AC coupled noise measurements, is to the magnitude of the diagnostic threshold values, which will be discussed below.

Figure 4:
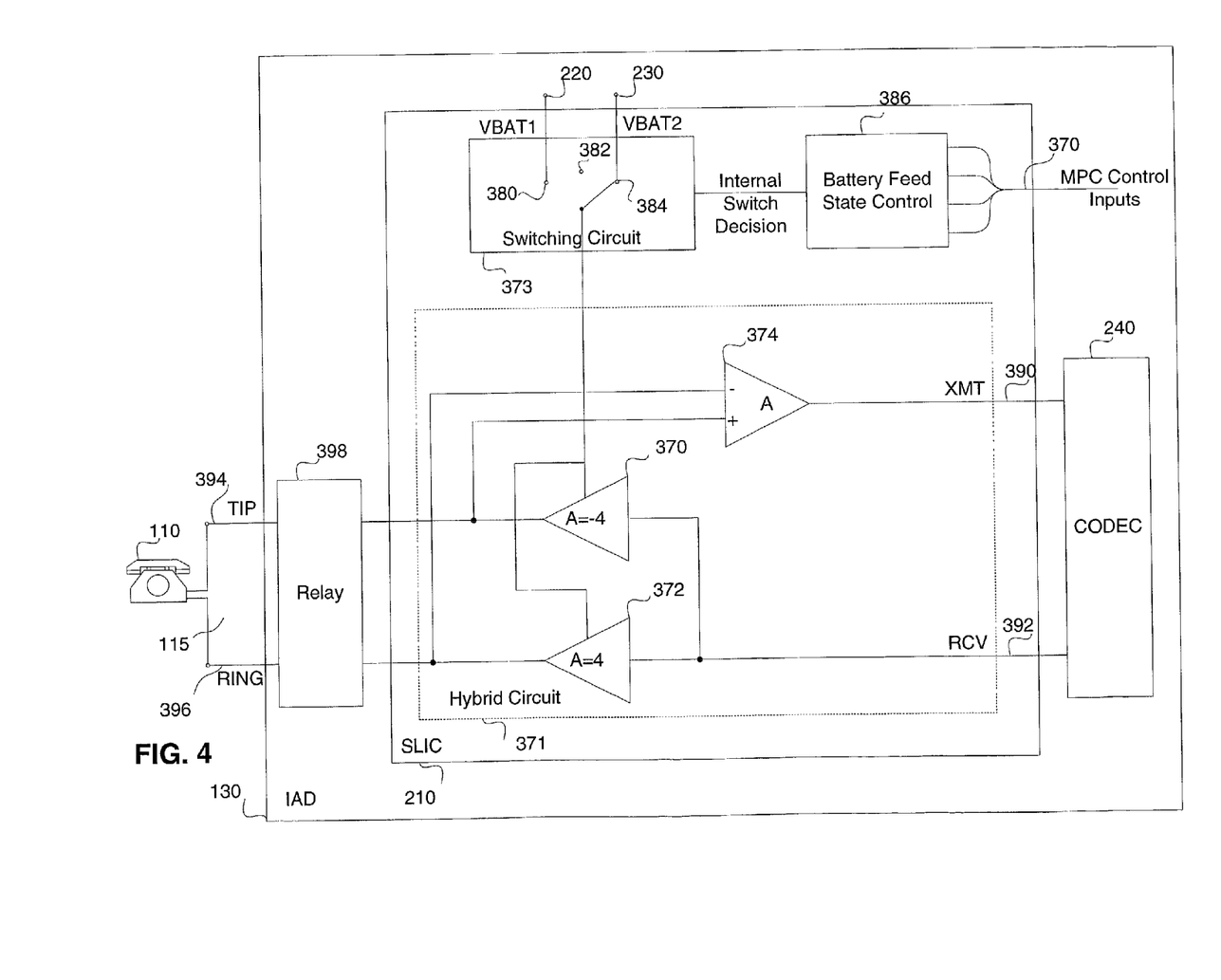
FIG. 4 shows detail of the SLIC of FIG. 3.

FIG. 4 illustrates details of SLIC 210. SLIC 210 communicates analog signals via transmit line 390 and receive line 392 to and from CODEC 240 and communicates via a combined tip 394 and ring 396 loop 115 with a POTS device 110. The tip-ring loop 115 is formed by a POTS device 110 on one end connected via a tip line 394 and a ring line 396 to an appropriate apparatus such as IAD 130. Tip line 394 is referenced against ring line 396 and hence tip-ring ioop 115 is considered a two-wire loop. In contrast, transmit line 390 is referenced against a ground line and receive line 392 is also referenced against a ground line. Hence, a counterpart four-wire conceptual loop (not shown) is formed by the interconnection of: (a) the hybrid circuit 371; (b) one pair of wires that represent the transmit line 390 and the ground wire it is referenced to; (c) and another pair of wires that represent the receive line 392 and the ground wire it is referenced to; and (d) a device downstream of the communication path that connects with the four wires. Thus, the hybrid circuit 371 interfaces a 2-wire loop to a 4-wire loop. This 4-to-2 arrangement is backwardly compatible with conventional POTS network architectures, which use a 2-wire loop for local transmission (i.e., near the POTS device) and use a 4-wire arrangement (one 2-wire loop for transmitting and another 2-wire loop for receiving) for long-range transmissions. Long-range wire transmissions require signal amplification which is made possible by separation of the receive and transmit analog signals.

The 4-wire to 2-wire interface has been accomplished in the prior art using a hybrid transformer. SLIC 210 includes the 4-wire to 2-wire interface in the form of hybrid circuit 371, which includes Op amps 370, 372, and 374. The tip drive amplifier 370 and the ring amplifier 372 have significance to the invention because the supply voltage of these two Op amps is pulsed as discussed below.

SLIC 210 interfaces via a relay 398 to the tip and ring lines 394 and 396, respectively. The relay 398 disconnects analog voice signals from the POTS device when the POTS device is "on-hook," and connects the analog signals when "off-hook." When the POTS device is "on-hook" the tip-ring loop alternatively connects the POTS device ring detector (not shown) to the IAD 130.

SLIC 210 also receives digital MPC control inputs 270, which control internal SLIC states. SLIC 210 includes a battery feed state control circuit 386, which, per the MPC instructions, controls the switching circuit 373 that receives battery supply voltages VBAT1 220 and VBAT2 230 and feeds the appropriate voltage to the tip drive 370 and ring drive 372 amplifiers. Switching circuit 373 has at least three connection states: (a) VBAT1 connection 380—when VBAT1 is fed to the amplifiers; (b) forward disconnection 382—when the tip and ring amplifiers are turned off; and (c) VBAT2 connection 384—when VBAT2 is fed to the amplifiers.

The invention pulses the source voltage of the tip amplifier 370 and ring amplifier 372 as follows. To conduct the diagnostic methods of the invention, the MPC 260 (as referenced in FIG. 3) executes a software algorithm which sends the necessary control signals on lines 370 to battery feed state control circuit 386, which based in part on MPC control inputs, makes the necessary power switching decisions for the switching circuit 373 to make the appropriate physical connection to feed the tip and ring amplifiers 370 and 372.

Figure 5:
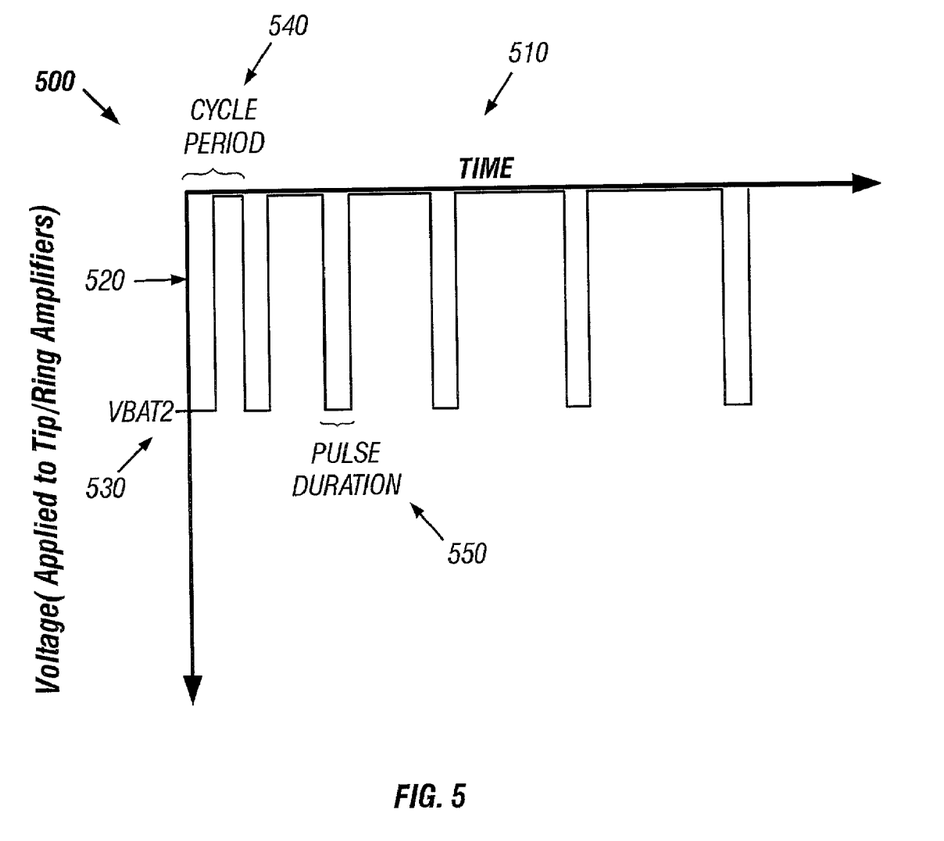
FIG. 5 is a voltage versus time graph that traces the frequency sweep pulse characteristics of one embodiment of the invention.

Pulsing the amplifier voltage source in various manners presents unique pulse characteristics that establish different aspects of the invention. FIG. 5 is a voltage versus time graph 500 of one such pulse characteristic that can be used to remotely determine whether a POTS device 110, in an on-hook state, is connected to IAD 130 and whether VBAT2 is functional. Graph 500 Y-axis 520 corresponds to the voltage applied to the tip 370 and ring 372 amplifiers during diagnostic tests of the invention, and the graph 500 X-axis 510 corresponds to time. The graph 500 voltage cycles have fixed length pulses 550 and increasingly longer cycle periods 540. The voltage applied to the tip 370 and ring 372 amplifiers pulses from a near zero value (obtained by placing SLIC 210 in a forward disconnect state 382) to a VBAT2 value 530. The increasingly long cycle periods 540 represent a frequency sweep, which is central to this embodiment of the invention.

In this embodiment, the noise caused by pulsing the amplifiers is aggregated at the CODEC 240 and, according to another aspect of the invention, analyzed by the MPC 260. Sweeping through a range of frequencies in the AC loading of the ring detector and/or ringer circuit of a POTS device 110 presents a non-linear response at the CODEC 240.

Figure 6:
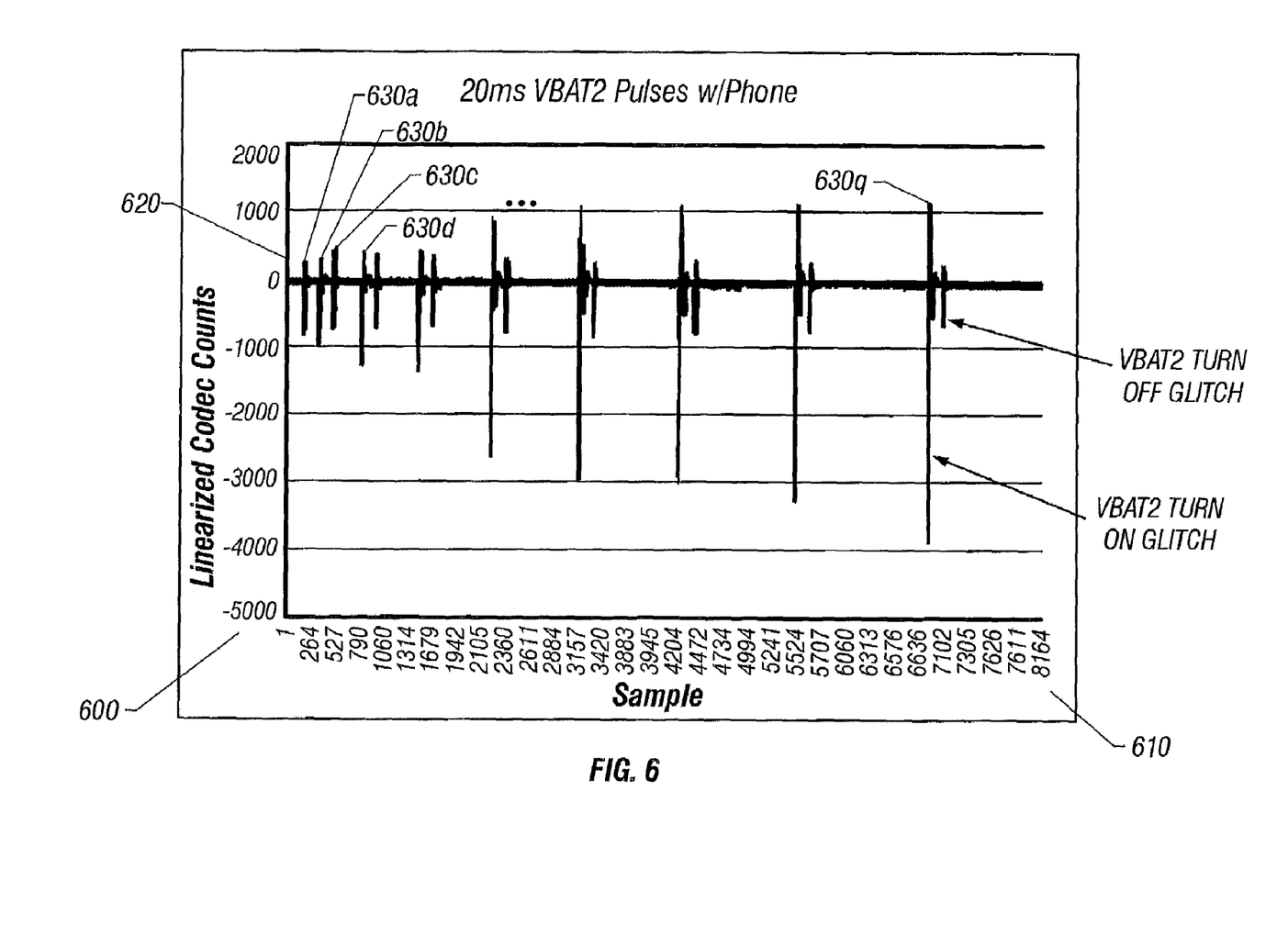
FIG. 6 is noise plot for a first embodiment of the invention when a POTS device is connected to the IAD.
Figure 7:
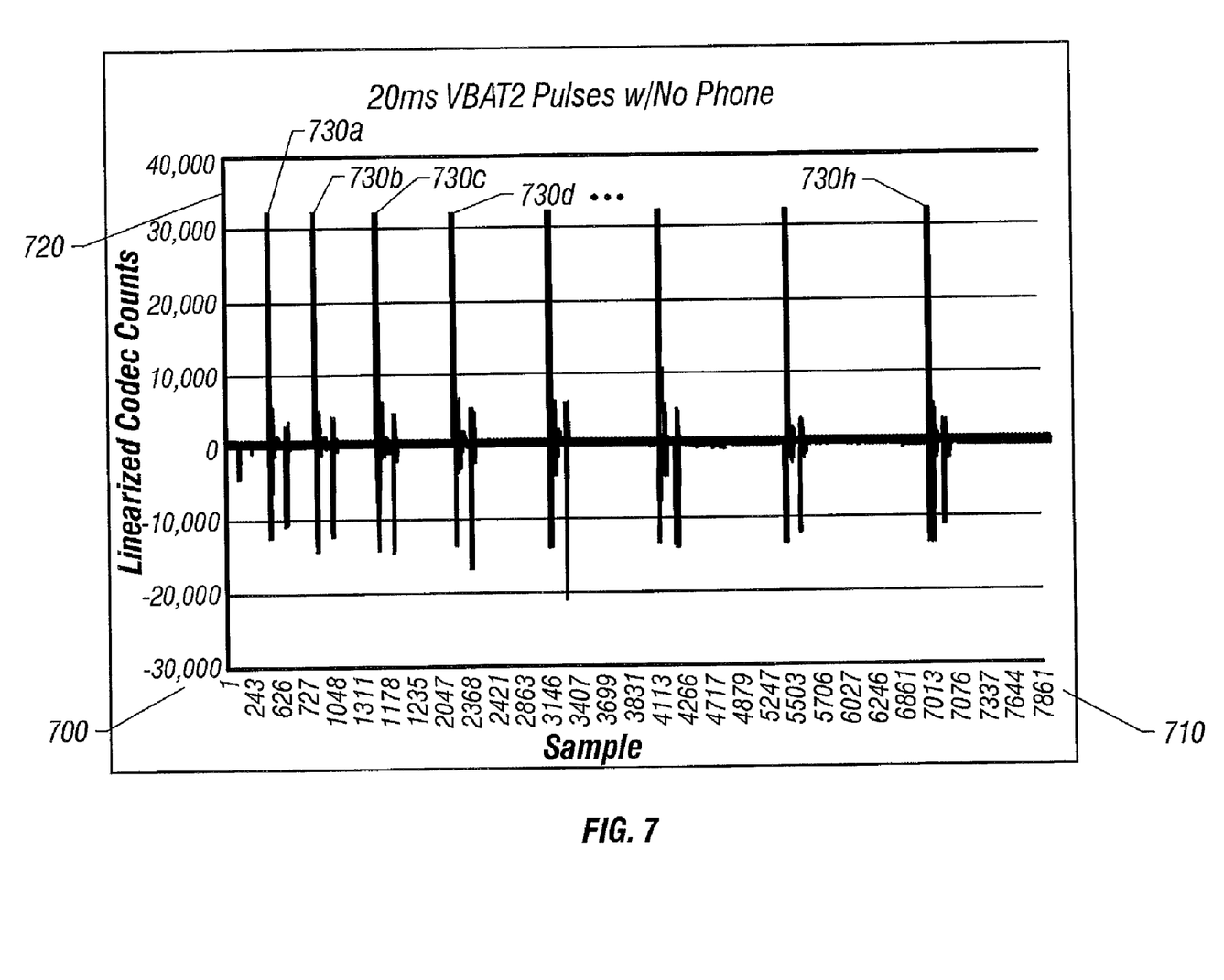
FIG. 7 is a noise plot for a first embodiment of the invention when no POTS device is connected to the IAD.

FIGS. 6 and 7 provide contrasting examples of empirical data collected in experimental runs of this aspect of the invention. The FIG. 6 graph 600 has an x-axis 610, a y-axis 620, and a series of spikes 630*a* through 630*q* representing noise data where a POTS device 110 is connected to the IAD 130. The FIG. 7 graph 700 has an x-axis 710, a y-axis 720, and a series of spikes 730*a* through 730*n* representing noise data where no POTS device is connected to the IAD 130. In both graphs 600 and 700, the x-axis correlates to time while the y-axis correlates to the magnitude of the noise measured by the CODEC 240. This frequency sweep causes two indicia in the noise response, which the diagnostic algorithm looks for. First, as a comparison of FIG. 6 and FIG. 7 reveals, the connection of a POTS device 110 causes noise amplitude to increase as pulse frequency decreases. Second, the connection of a POTS device 110 causes FIG. 6 noise spikes 630*a* through 630*q* that have maximum amplitude below an apparent threshold of approximately 1000 linearized codec counts, while FIG. 7 noise spikes 730*a* through 730*n* all exceed that threshold by a factor of about 30. Thus, if the appropriate amplitude indicia are present, the MPC 260 can report that a POTS device 110 is connected to the IAD 130. Additionally, the MPC 260 can report that VBAT2 230 is also functional.

Not shown in FIG. 6 and in FIG. 7 is empirical data dealing with a disabled VBAT2. However, if VBAT2 were not functioning, the peak-to-peak voltage swing would drop below a predetermined threshold value. Thus, a diagnostic algorithm would assess the failure of VBAT2 by noting a peak-to-peak noise measurement that is below a defined algorithm.

A second embodiment of the present invention is similar to the first embodiment but the DSP 250, if present, is instructed not to filter out noise. Then, with the POTS device 110 in an on-hook state, the same frequency sweep is remotely executed and the resultant noise is allowed to propagate all the way up to the gateway 150 or even beyond the class 5 switch. At the remote site, presence of the necessary noise indicia indicates that all hardware components up to the SLIC 210 (including VBAT2 230) are functional.

Figure 8:
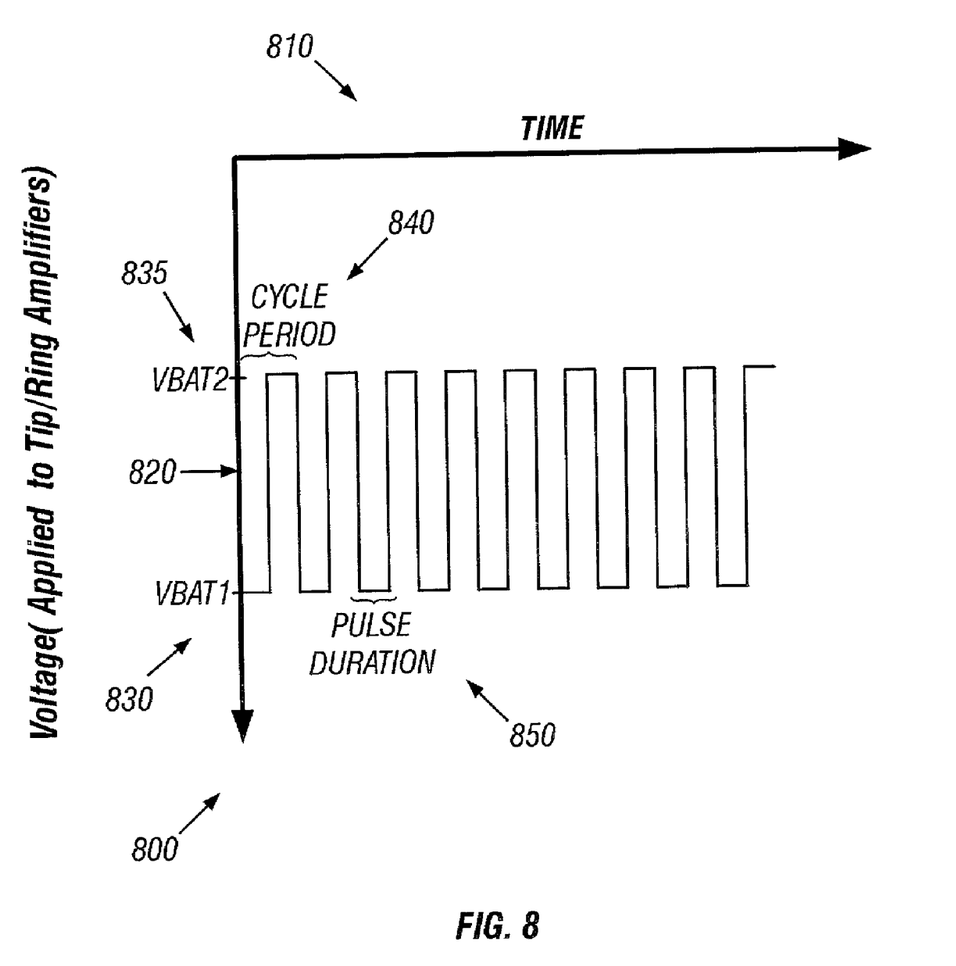
FIG. 8 is a voltage versus time graph that traces the fixed period pulse characteristics of a third embodiment of the invention.

A second variation of the amplifier voltage source pulse characteristics provides a third embodiment of the invention. FIG. 8 shows a second pulse characteristic, which can be used to remotely assess some of the functionality in: the IAD batteries 220 and 260, the SLIC 210 and associated switching circuits 373 and 386 and associated 4-wire to 2-wire hybrid circuit 371, and the CODEC 240.

It should be noted that due to the protection diode between VBAT2 and VBAT1, VBAT1 can not be tested the same way VBAT2 is tested because even if VBAT1 fails, it will still have the VBAT2 voltage level due to the protection diode.

FIG. 8 is a graph 800 with a y-axis 820 corresponding to the voltage applied to the tip 370 and ring 372 amplifiers during diagnostic testing and with an x-axis 810 corresponding to time. The graph 800 pulses have fixed duration cycle periods 840 and fixed duration pulses 850. The voltage applied to the tip 370 and ring 372 amplifiers pulses from a VBAT2 value 830 (obtained by placing the SLIC 210 in a VBAT2 connection 384) to a VBAT1 value 835 (obtained by placing the SLIC 210 in a VBAT1 connection 380). The fixed cycle periods 840 are a central characteristic of this embodiment in contrast to the first and second embodiments where periodicity varies. In this third embodiment, as in the first and second embodiments, noise is aggregated at the CODEC 240 and analyzed by the MPC 260.

FIGS. 9 through 12 provide contrasting examples of empirical data collected in experimental runs of this fixed-frequency embodiment of the invention.

Figure 9:
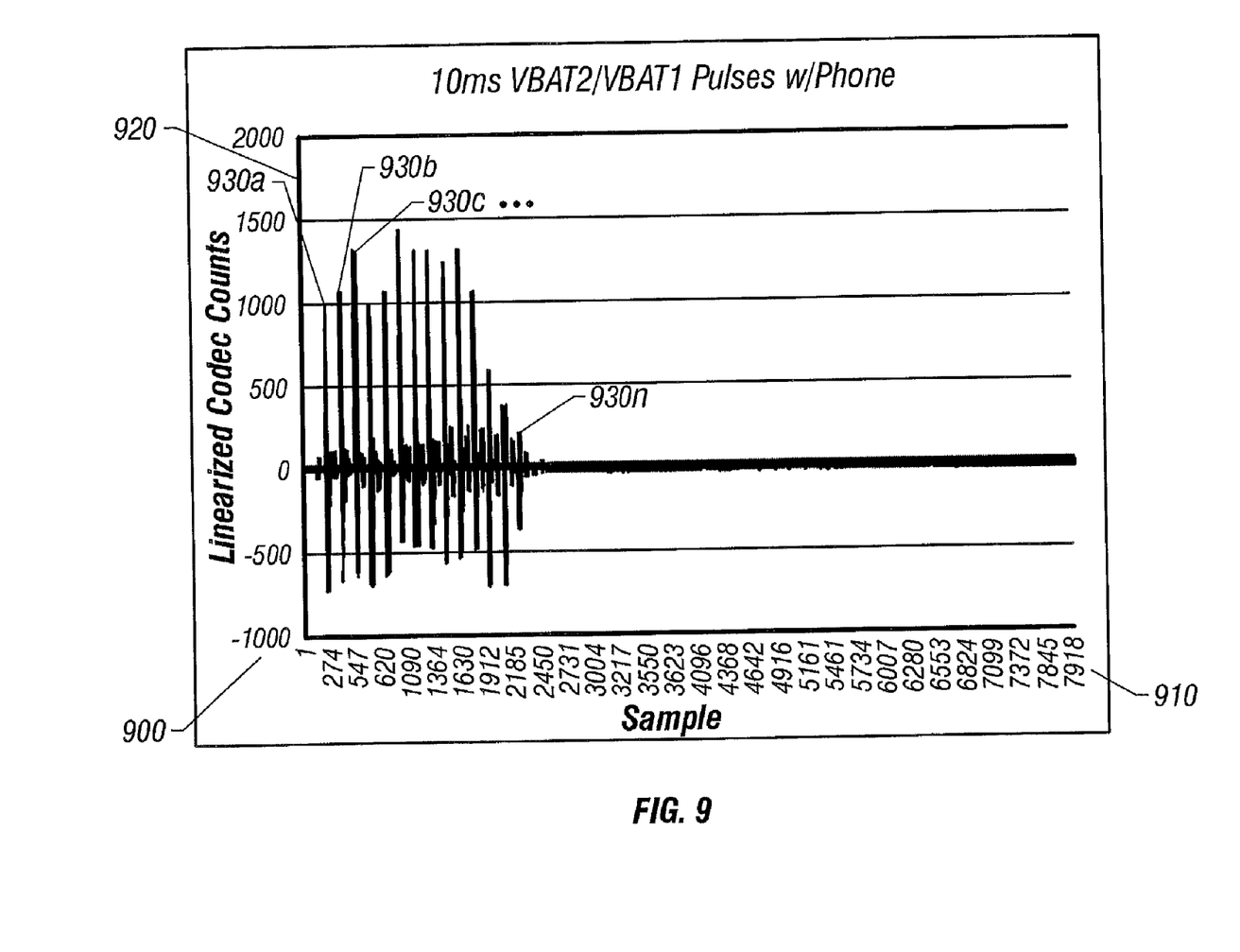
FIG. 9 is a noise plot for a third embodiment of the invention when both power supplies are functional and a POTS device is connected to the IAD.

FIG. 9 is a graph 900 having an x-axis 910 that correlates to time, a y-axis 920 that correlates to resultant noise magnitude, and a series of noise spikes 930*a* through 930*n*. The empirical data of FIG. 9 has both VBAT1 220 and VBAT2 230 in a functional state and a POTS device 110 connected to IAD 130.

Figure 10:
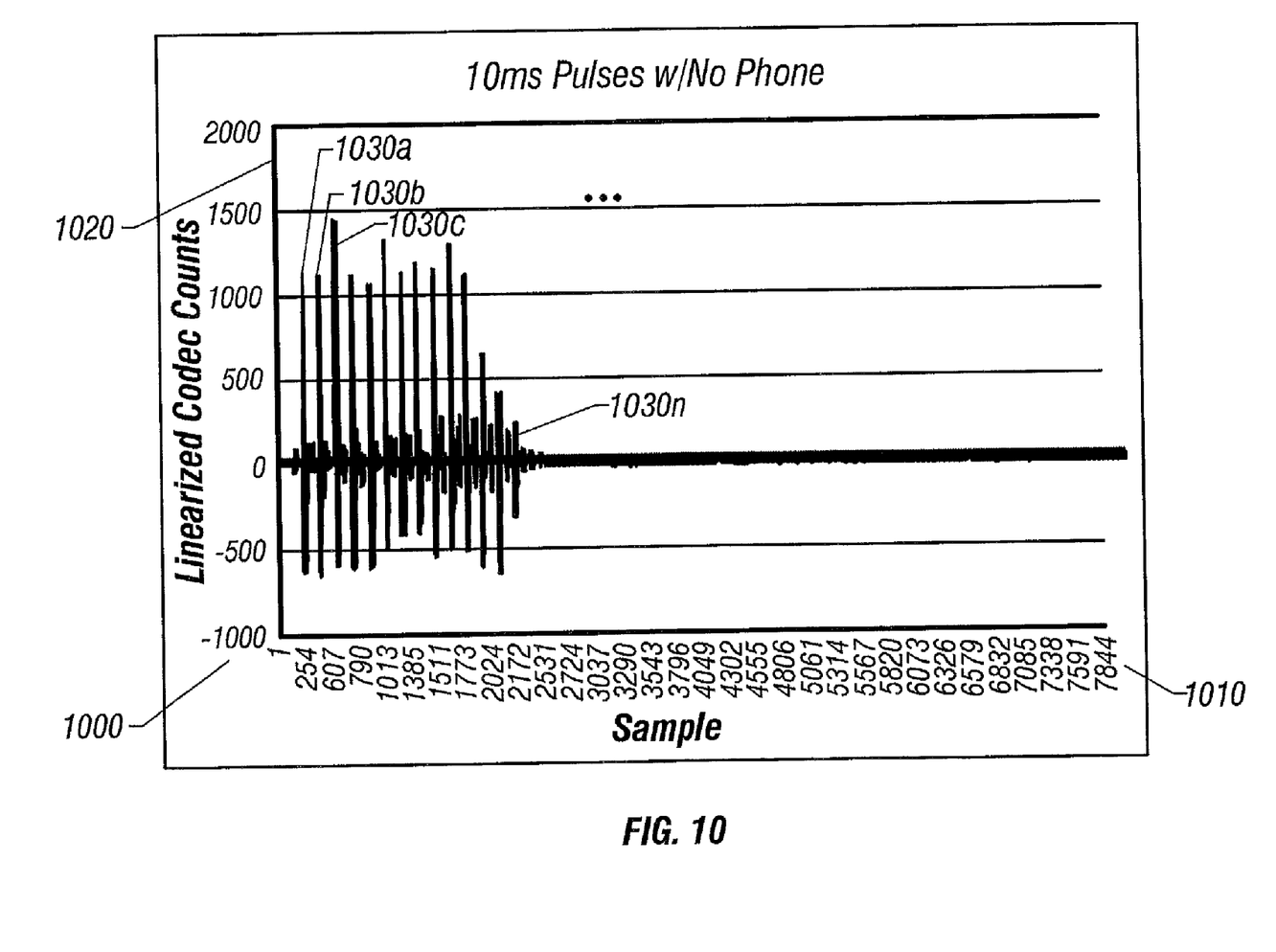
FIG. 10 is a noise plot for a third embodiment of the invention when both supplies are functional and no POTS device is connected to the IAD.

FIG. 10 is a graph 1000 having an x-axis 1010 that correlates to time, a y-axis 1020 that correlates to resultant noise magnitude, and a series of noise spikes 1030*a* through 1030*n*. The empirical data of FIG. 10 has both VBAT1 220 and VBAT2 230 in a functional state but without a POTS device 110 connected to IAD 130.

Figure 11:
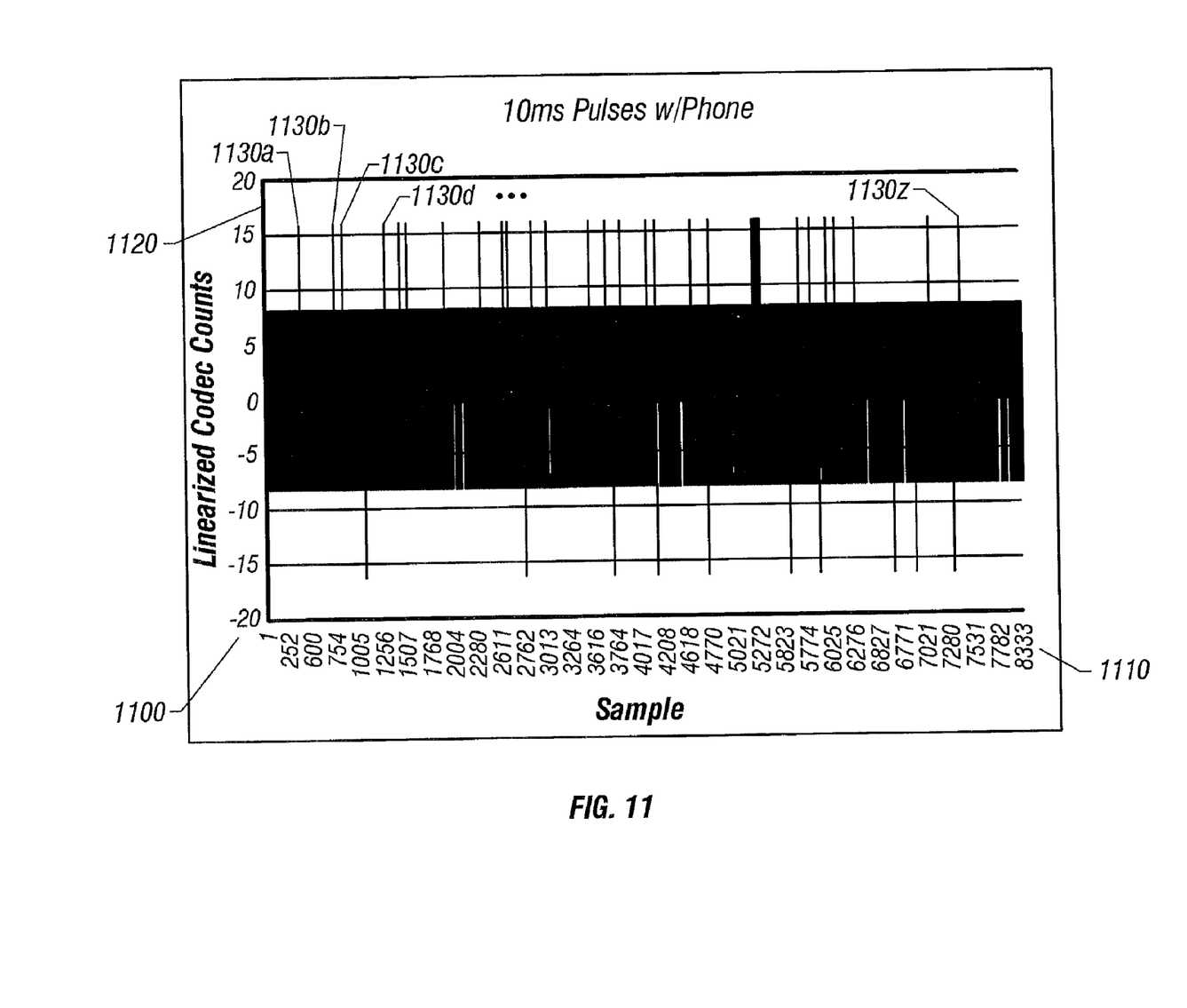
FIG. 11 is a noise plot for a third embodiment of the invention when the primary power supply is disabled and a POTS device is connected to the IAD.

FIG. 11 is a graph 1100 having an x-axis 1110 that correlates to time, a y-axis 1120 that correlates to resultant noise magnitude, and a series of noise spikes 1130*a* through 1130*z*. The empirical data of FIG. 11 has VBAT1 220 in a disabled state and with a POTS device 110 connected to IAD 130.

Figure 12:
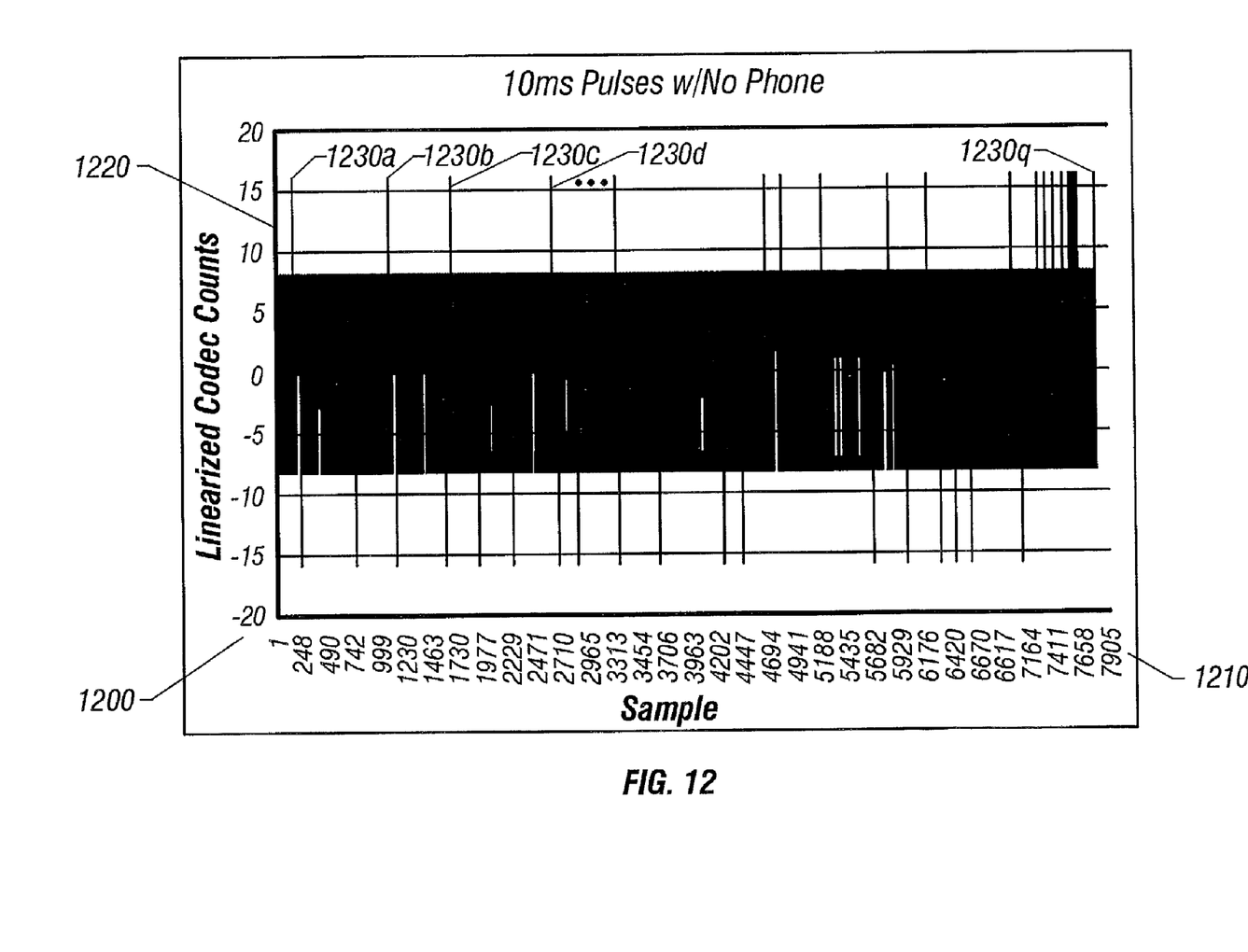
FIG. 12 is a noise plot for a third embodiment of the invention when the primary power supply is disabled and no POTS device is connected to the IAD.

Finally, FIG. 12 is a graph 1200 having an x-axis 1210 that correlates to time, a y-axis 1220 that correlates to resultant noise magnitude, and a series of noise spikes 1230*a* through 1230*q*. The empirical data of FIG. 12 has VBAT1 220 in a disabled state but without a POTS device 110 connected to IAD 130.

A combined inspection of FIGS. 9 through 12 shows that a threshold indicia can be used to determine if the battery supplies 220 and 230 are functional, since the maximum amplitude of the noise spikes is overwhelmingly larger when both battery supplies 220 and 230 are functional versus when VBAT1 220 is disabled, irrespective of whether a POTS device 110 is connected to IAD 130. Similar indicia can be used to assess the condition of other IAD 130 components. Thus, a third embodiment of the invention involves remotely initiating a pulsing of the tip 370 and ring 372 amplifiers in a fixed frequency mode. The resultant noise is aggregated at the CODEC 240 and analyzed by the MPC 260. If the appropriate amplitude indicia are present, the MPC 260 can report on some of the functionality in: the IAD batteries 220 and 230, the SLIC 210 and associated switching circuits 386 and 373 and the associated 4-wire to 2-wire hybrid circuit 371, and the CODEC 240.

While the invention has been described herein with reference to three exemplary embodiments, they are for illustrative purposes only and not intended to be limiting. Therefore, those skilled in the art will recognize that other embodiments can be practiced without departing from the scope and spirit of the claims set forth below.

What is claimed is:

1. A system for remotely diagnosing voice over broadband circuitry, comprising:
   a broadband line; and
   an integrated access device coupled to the broadband line, the integrated access device comprising:
      a microprocessor controller coupled to the broadband line;
      a CODEC connected to the microprocessor controller;
      a subscriber line interface circuit coupled to the CODEC, the subscriber line interface circuit comprising:
         tip and ring amplifiers; and
         a switching circuit for pulsing source voltage of the tip and ring amplifiers;
      a primary battery supply and an auxiliary battery supply coupled to the subscriber line interface circuit;
      a POTS port coupled to the subscriber line interface circuit and providing a coupling to a POTS device; and
      a signal line, configured to interconnect the broadband line, microprocessor controller, CODEC, subscriber line interface circuit, and POTS port;
      wherein the microprocessor controller is configured to execute a software algorithm configured to control the switching circuit into pulsing source voltage of the tip and ring amplifiers in predetermined patterns that will cause noise in the signal line that may be used to determine a status of the integrated access device.

2. The system of claim 1, wherein the software algorithm is further configured to pulse the tip and ring amplifiers' source voltage from a forward disconnect state to a VBAT2 state in a frequency sweep mode.

3. The system of claim 1, wherein the software algorithm is further configured to pulse the tip and ring amplifiers' source voltage from a VBAT2 state to a VBAT1 state in a fixed frequency mode.

4. The system of claim 1, wherein the microprocessor controller is configured to commence execution of the software algorithm in accordance with a programming logic instruction internal to the integrated access device.

5. The system of claim 1, wherein the microprocessor controller is configured to commence execution of the software algorithm in accordance with an instruction received via a broadband line from a source external to the integrated access device.

6. The system of claim 1, wherein the microprocessor controller is configured to commence execution of the software algorithm in accordance with an instruction received via an RS-232 port from a source external to the integrated access device.

* * * * *